United States Patent [19]

Shymko et al.

[11] Patent Number: 5,781,112
[45] Date of Patent: Jul. 14, 1998

[54] ELECTRONIC TAGGING DEVICE FOR IDENTIFYING TRANSPORTED PRODUCTS

[76] Inventors: Wayne W. Shymko, 34 Dvoras Cove, Winnipeg, Manitoba, Canada, R2W 2Z2; Gilbert R. Emond, 90 Willowmead Bay, Winnipeg, Manitoba, Canada, R2M 4P3

[21] Appl. No.: 794,642

[22] Filed: Feb. 3, 1997

[51] Int. Cl.[6] ............................................. G08B 13/14
[52] U.S. Cl. .................. 340/572; 340/539; 340/573; 340/825.54
[58] Field of Search ..................... 340/572, 539, 340/573, 825.54, 447, 445

[56] References Cited

U.S. PATENT DOCUMENTS

| | | | |
|---|---|---|---|
| 4,129,855 | 12/1978 | Rodrian | 340/825.54 |
| 4,649,397 | 3/1987 | Heaton | 340/572 |
| 4,911,217 | 3/1990 | Dunn et al. | 340/825.54 |
| 5,146,204 | 9/1992 | Zhou | 340/572 |
| 5,204,670 | 4/1993 | Stinton | 340/825.54 |
| 5,574,470 | 11/1996 | Vall | 340/572 X |
| 5,583,489 | 12/1996 | Loemker | 340/572 |
| 5,589,820 | 12/1996 | Robinson | 340/572 |

*Primary Examiner*—Jeffery Hofsass
*Assistant Examiner*—Anh La
*Attorney, Agent, or Firm*—Adrian D. Battison; Murray E. Thrift

[57] ABSTRACT

A transmitter for use in the food industry for unique identification of a transport device such as a hanger for a carcass or a container for food products is mounted within a housing which protects the transmitter from heat, water, corrosive materials and shock loads. The housing comprises a cylindrical ring having one end welded to a suitable support element on the hanger and a second open end. The transmitter itself is in the form of a flat disc molded within a generally cylindrical body which can be inserted into the ring. A male thread is formed on the outside of the cylindrical body and a female thread of the inside of the ring allowing the device to be readily attached into the ring. The body is molded from silicone rubber which provides the necessary protections while allowing the communication of signals to and from the transmitter through the open face of the ring.

20 Claims, 3 Drawing Sheets

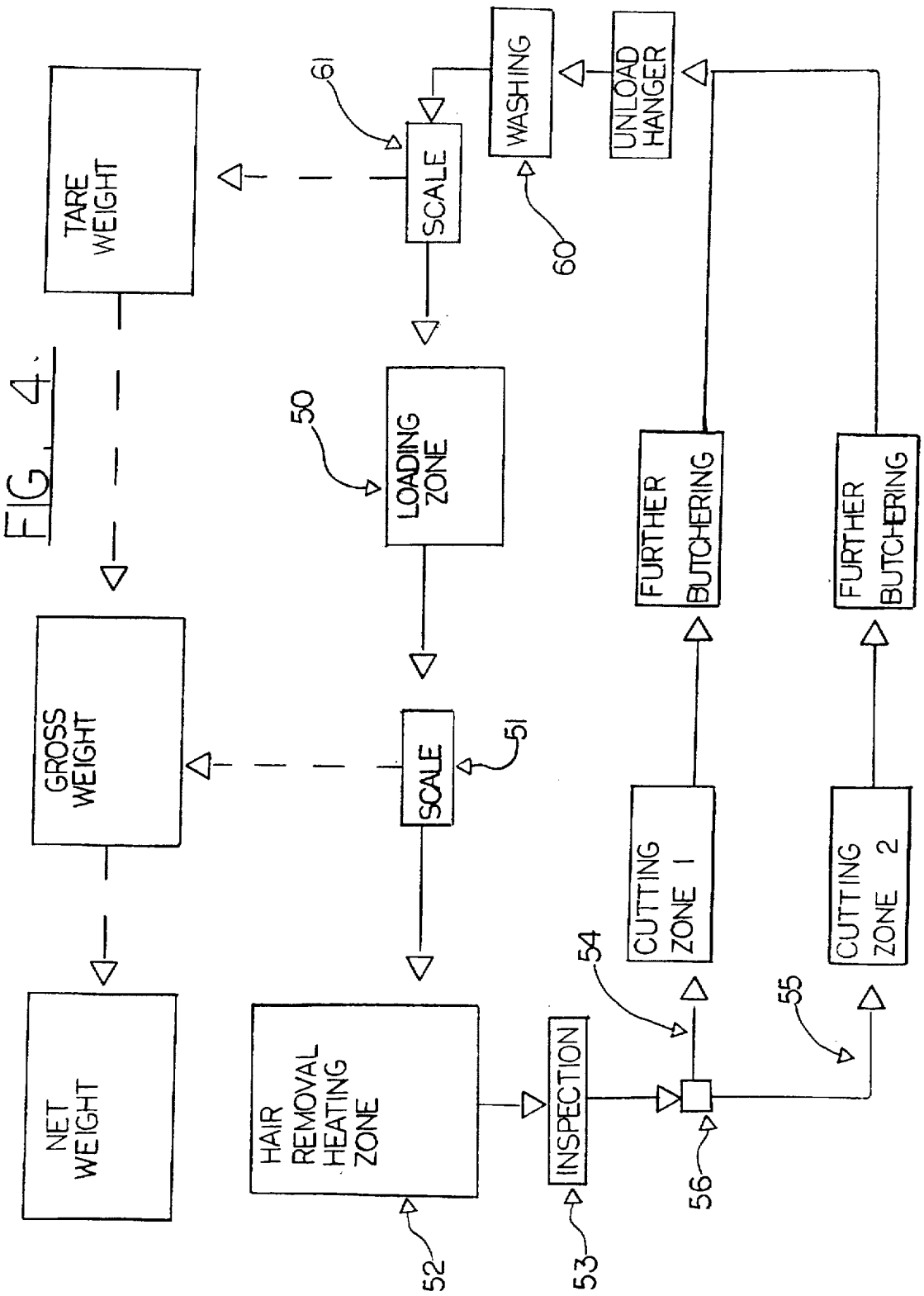

ELECTRONIC TAGGING DEVICE FOR IDENTIFYING TRANSPORTED PRODUCTS

BACKGROUND OF THE INVENTION

This invention relates to an electronic tagging device for identifying transported products and is particularly but not exclusively designed for use with food products such as animal carcasses, fish and the like where the tagging device must pass through a harsh environment including heat, water, corrosive materials and impact or shock loadings.

It has been a highly desirable objective in the meat processing industry for some years to provide an electronic tagging device which allows individual hangers for the carcasses to be identified, thus allowing identification of the particular carcass carried by that hanger during its movement through the various processing stations.

Such an electronic tagging of the hangers has a number of significant advantages.

Firstly it allows the individual weight of the hanger to be detected prior to attachment of the carcass so that the actual weight of the hanger can be deducted from the weight of the carcass to provide an actual weight of the carcass. Without such a tagging device, it is necessary to use for the deduction of the weight of the hanger a conservative, actual or estimated minimum weight of all of the hangers, bearing in mind that the hangers can vary significantly in weight depending upon their age and condition. As the plant pays for the carcasses based upon the calculated weight of the carcass, the plant is obliged, in such a process where the hanger weight is estimated to pay based upon this conservative estimate rather than the actual weight. It is known that a significant cost saving can be obtained by paying for the actual weight of the carcass rather than the estimated weights.

Secondly, improvements in processing can be obtained by identifying carcasses with certain characteristics for different processing and to use the tagging system to ensure that the carcasses with the required characteristics are moved to the required processing situations. In the absence of an effective tagging system, this cannot be done effectively or needs to be done on a manual basis which requires closer attention and increased labor costs.

Thirdly the use of an electronic tagging device on each hanger allows the system to be formed into a closed loop arrangement in which the hangers are automatically returned to the initial loading location and prior to entry into the loading location are re weighed to provide an actual weight of the hanger prior to receiving the carcass. During the recirculation process, the hanger is required to be cleaned and therefore the hanger and the tagging device must pass through a corrosive cleaning process.

Attempts have been made to provide electronic tagging device in order to obtain the above significant advantages.

Transmitters are available which are activated in a magnetic field to issue a coded signal which is generally digital in the form of a serial number unique to the particular transmitter. Such devices are relatively small and do not have high power requirement and accordingly are ideal for situations of this type.

The present invention is particularly concerned with the meat processing industry but other food products can also advantageously use the same arrangements, for example the seafood industry and poultry processing. In the processing of meat and poultry products, normally the tagging device is attached to a hanger for the individual carcass. In the fish or seafood industry, the seafood is often contained in a stainless steel tote and in such a case the electronic tagging would be attached to the individual tote.

In all these industries, the transportation device, that is the hanger or container, must pass through various areas which include those having relatively harsh environments. Thus the transportation device will encounter water, heat, corrosive materials, shock or impact loadings due to impacts of the transportation device with other such devices or dropping of the transportation device from an overhead conveyor.

It is necessary therefore that the known transmitter of the above type must be housed on the transportation device in a manner which allows it to accommodate the above harsh environmental conditions.

For example, it is desirable that the housing of the transmitter will allow the transmitter to accommodate heat from boiling water for a period of up to four hours and heat from an oven of 400° F. up to 25 minutes. While these are not necessarily characteristics which may be met in all circumstances, it is believed that a transmitter device which accommodates these characteristics would likely be suitable in most processing environments.

Attempts have been made to mount a transmitter of this general type on a hanger of a meat processing system. Previous attempts have concentrated upon providing a housing generally of stainless steel which fully encloses and encompasses the transmitting elements and which contains suitable mounting assemblies for the transmitting elements so they are held secure and protected from the environment. The housing is then bolted to a bracket attached to the hanger. However these arrangements have been very complex and therefore expensive and have also been ineffective since the stainless steel housing often interferes with the transmitted signal or with the magnetic field to which the transmitter responds thus interfering with the proper operation of the transmitter.

Up till now, therefore, devices of this type have not been successful and there has been no wide scale adoption of such devices despite the significant advantages which are known to exist.

SUMMARY OF THE INVENTION

It is one object of the present invention, therefore, to provide an improved electronic tagging apparatus for use with transported products such as carcasses or other materials used in the food industry.

According to one aspect of the invention there is provided an electronic tagging apparatus comprising:

an electronic transmitter for transmitting an electronic code signal providing an identification code substantially unique to the transmitter; and and a housing arranged for mounting the transmitter on an object to be tagged and arranged such that the housing encloses the transmitter and protects the transmitter from heat, water, corrosive materials and trauma, the housing comprising:

a substantially rigid mounting member for attachment to the object;

a body molded from an elastomeric material encapsulating the transmitter;

and means mounting the body on the mounting member.

Preferably the body is molded from a material that does not impede transmission of the signal.

Preferably the body is molded from silicone rubber.

Preferably the transmitter is arranged to transmit the code signal when in the presence of a magnetic field.

Preferably the mounting member is welded to the object.

Preferably the mounting member includes a peripheral wall defining a receptacle with an open front face and wherein the body includes an insert portion which is shaped to engage into the receptacle and includes an end portion which defines a front surface covering the open front face and the peripheral wall of the mounting member forms a ring.

Preferably the insert portion of the body includes connecting means molded thereon for releasably and readily reengageably connecting with the mounting member.

Preferably the connecting means comprises a thread surrounding a cylindrical outer wall of the insert portion and wherein the peripheral wall of the mounting member comprises a ring with a female thread on an inside surface thereof.

Preferably the end portion is of larger transverse dimension than he open front face to define a shoulder surrounding the open front face.

Preferably the insert portion has molded thereon projecting elements for engaging the peripheral wall of the mounting member for holding the body in place inside the mounting member.

Preferably the transmitter is physically connected to the mounting member only through the elastomeric material of the body.

Preferably the body is formed solely from said elastomeric material.

According to a second aspect of the invention there is provided an apparatus for tracking a plurality of product elements during transportation thereof comprising:

a plurality of transport devices for moving the product elements through a series of processing stations, each transport device being arranged to receive a respective one of the plurality of product elements;

each transport device having mounted thereon a respective one of a plurality of electronic tagging devices, each comprising:
    an electronic transmitter for transmitting an electronic code signal providing an identification code substantially unique to the transmitter; and
    and a housing arranged for mounting the transmitter on an object to be tagged and arranged such that the housing encloses the transmitter and protects the transmitter from heat, water, corrosive materials and trauma, the housing comprising:
      a substantially rigid mounting member attached to the respective transport device;
      a molded elastomeric body encapsulating the transmitter;
      and means mounting the body on the mounting member.

According to a third aspect of the invention thereis provided a method for tracking a plurality of product elements during transportation thereof comprising:

mounting each product element on a respective one of a plurality of transport devices;

moving the transport devices with the food product elements thereon through a series of processing stations;

mounting on each transport device a respective one of a plurality of electronic tagging devices, each comprising:
    an electronic transmitter for transmitting an electronic code signal providing an identification code substantially unique to the transmitter; and
    and a housing arranged for mounting the transmitter on an object to be tagged and arranged such that the housing encloses the transmitter and protects the transmitter from heat, water, corrosive materials and trauma, the housing comprising:
      a substantially rigid mounting member attached to the respective transport device;
      a molded elastomeric body encapsulating the transmitter;
      and means mounting the body on the mounting member;
    at one or more stations, causing the transmitter to emit said code signal;
    and detecting said signal to identify the tagging device and therefore the product element associated therewith.

One embodiment of the invention will now be described in conjunction with the accompanying drawings in which:

BRIEF DESCRIPTION OF THE DRAWINGS

FIG. 4 is a schematic illustration of a process used in an animal processing plant and utilizing the tagging device of FIG. 1.

In the drawings like characters of reference indicate corresponding parts in the different figures.

DETAILED DESCRIPTION

Figure 1:
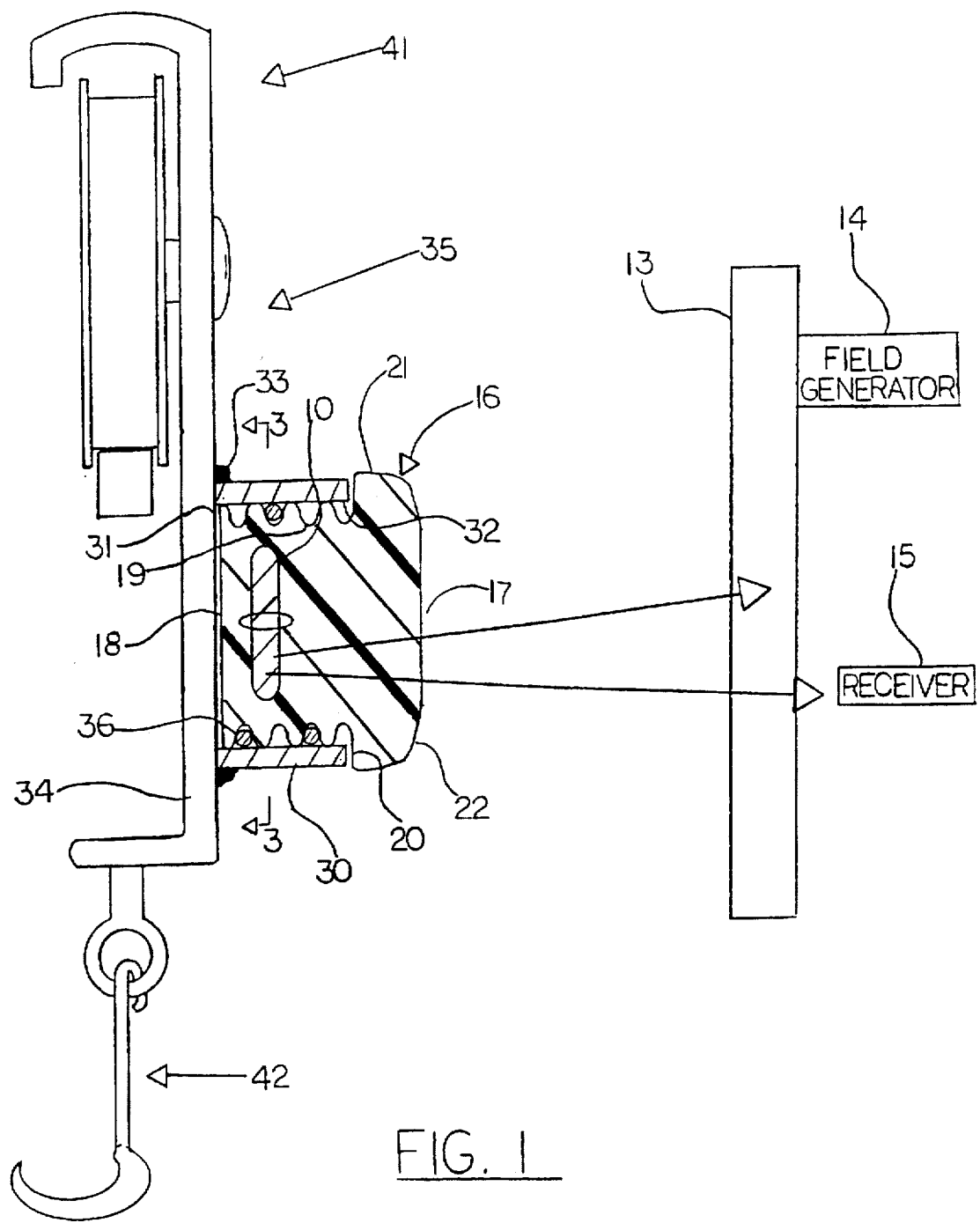
FIG. 1 is a vertical cross sectional view through the electronic tagging device according to the present invention shown attached to a schematically illustrated transportation device and shown in cooperation with a detector element used with the tagging device.
Figure 2:
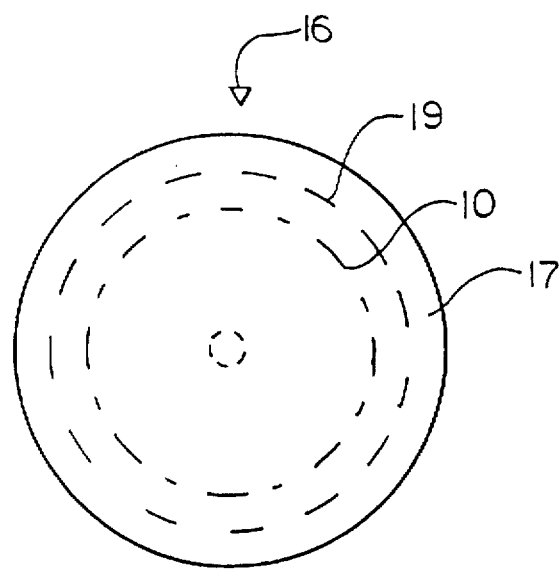
FIG. 2 is a front elevational view of the tagging device of FIG. 1.
Figure 3:
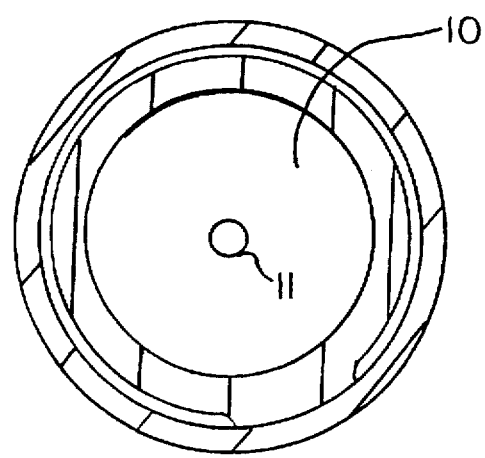
FIG. 3 is a cross sectional view along the lines 3—3 of FIG. 1.

The electronic tagging device shown in FIGS. 1, 2 and 3 comprises an electronic transmitter 10 which is of the type manufactured by Motorola although any similar arrangement can be used which provides the same purpose. The device is commercially available and accordingly will not be described in detail but comprises in structure a circular disc of approximately 0.75 inches in diameter and a thickness of the order of 0.15 inches with a central hole 11.

As is well known, this transmitter is activated by a magnetic field and in FIG. 1 this is transmitted by a plate antenna 13 with the field being generated by a generator indicated schematically at 14. In response to the magnetic field, the transmitter is programmed to generate a coded signal which is then transmitted in the form of a modulated electronic magnetic field which can then be detected by a receiver 15. The receiver and the transmitter are tuned so that the receiver can directly provide an output signal of an identification code unique to the transmitter.

The transmitter 10 is encapsulated within a molded body 16 formed of an elastomeric material. The body is formed wholly of the elastomeric material and the transmitter is located within the body so that it is spaced from all outside surfaces of the body and thus protected by the thickness of the body which varies at different locations in the body.

The body has a front surface 17 and a rear surface 18 both of which are generally flat with the surfaces parallel.

The body is molded to form a cylindrical surface 19 which extends from the end surface 18 partway along the length of the body. The end surface 18 is circular so as to define an end of the cylinder. The cylindrical surface 19 is molded to form a thread which extends along the surface and breaks out at the end 18 allowing the thread to be engaged onto a suitable female thread of the receptacle.

At the end of the surface 19 opposite to the end face 18, the body is molded so that it defines a shoulder 20 extending generally radially outwardly from the end of the surface to form thus an annular area around the surface 19. From the shoulder 20 to the end face 17 is defined a further cylindrical surface 21 so that the end face 17 and the cylindrical surface 21 in effect form a head of increased diameter relative to the surface 19. An outside rim of the end face 17 can be chamfered as indicated at 22.

The transmitter 10 is arranged parallel to the end faces 17 or 18 and is located closely adjacent the end face 18 that is on the side of the shoulder 20 toward the end face 18.

The receptacle for the molded body is indicated at 30 and comprises a metal or other rigid material ring defining a cylindrical wall having open ends 31 and 32. The end 31 of the ring 30 is welded as indicated at 33 to a support structure of a transport device generally indicated at 35. Thus the ring 30 is closed at the end 31 by the transport device leaving the front end 32 open. The ring thus forms a receptacle or container into which the body is inserted. The ring has a thread 36 formed on the inside surface as a female thread shaped to engage into the male thread section on the surface 19. The depth of the body between the shoulder 20 and the end face 18 is arranged to be substantially equal to the depth of the ring. The diameter of the surface 19 is equal to the diameter of the inside surface of the ring. Thus the male thread starting at the end 18 of the body can be engaged onto the female thread in the ring allowing the body to be threaded into position and held in position within the ring with the end cap portion projecting outwardly from the end of the ring and manually graspable by the fingers of a user to allow the body to be inserted readily into the ring and jails readily removed from the ring simply by rotation causing the threading and unthreading action.

As shown in FIG. 1, the magnetic field generating system is arranged adjacent the end cap portion of the body so that the communication of a magnetic field and the communication of the radio frequency signal from the transmitter can be effected through the material of the body rather than through the area of the ring.

The ring is formed from stainless steel so that it can be readily welded in place but also is resistant to corrosion which could interfere with the hygienic conditions of the device.

The body is molded from a suitable elastomeric material which is resistant to heat, water, corrosive liquids. A suitable elastomeric material comprises silicone rubber which is a high grade elastomeric material providing the above characteristics.

The locating of the transmitter disc within the area inside the ring provides additional protection for the transmitter element while allowing the communication with the transmitter through the open face of the ring. The body is relatively thin between the outside edge of the disc and the surface 19 and therefore the disc is held relatively stable while allowing the material between the disc and the ring to accommodate shock loads.

The major thickness of the material is between the outside surface and the front face of the disc and this thickness is sufficient to provide an insulation effect to prevent the application of heat from readily reaching the transmitter and thus causing damage. Surprisingly it has been found that the simple manufacture of the supporting body of silicone rubber with a diameter of the order of 1.5 inches and the thickness of the order of 0.75 inches enables the device to accommodate the temperatures set forth above.

In FIG. 1, the tagging device is shown attached to a schematically illustrated hanger for use in transporting a carcass. Thus the hanger includes the support structure 35 which is carried via a roller 40 on a rail 41 and includes a depending hanger section 42 on which the carcass is attached. The details of this arrangement are shown only schematically since these will be well known to one skilled in the art.

Turning now to FIG. 4, the device is used in a carcass processing system shown schematically. The processing system includes a loading zone 50 at which the freshly killed carcasses are applied to the hanger 42 on the rail 41 for conveying of the carcass through the various processing stages. Downstream of the loading zone is provided a scale 51 which weighs the hanger including all elements attached thereto and particularly the carcass.

After weighing the carcass transported by the hanger is passed through a heating zone 52 which is used to remove hair from the carcass and therefore the heat is relatively high for a relatively short period of time. Downstream of the heating zone, the carcass is inspected as indicated at 53 where its suitability for certain processing is determined. The processing roots are indicated at 54 and 55 and these are selected at a junction 56. The inspection zone and the junction 56 both include detection systems responsive to the transmitter so that the control system overseeing the operation of the process can receive information concerning the quality of the carcass and its required processing route. In this way the carcass can be automatically routed either to the section 54 or the section 55 depending upon the characterization determined at the inspection zone and depending upon detection of the unique ID code which is recorded in regard to the particular carcass.

After passing through the processing zones 54 or 55, the hanger after the carcass has been completely butchered and removed is dropped from the conveyor for storage or further processing. The further processing involves passing of the hanger through a washing zone 60 which requires the application of heated water and corrosive materials through the hanger and its attached elements to provide a suitable hygienic condition for the equipment.

Downstream of the washing system, the hanger is replaced on the conveyor and communicated to a scale 61 which measures the weight of the hanger itself including all equipment attached thereto but excluding the carcass so that the actual weight of the hanger can be determined, that is the tare weight.

Using the gross weight determined by the scale 51 and the tare weight determined by the scale 61, the net weight of the actual carcass can be determined without the necessity for averaging or calculations.

While the ring in the embodiment shown is of circular shape in elevational view, it is possible for other shapes of ring to be used. In addition, while the interconnection between the molded body and the ring is shown as a threaded connection, other such connections can be used including projecting pins or members on the body which provide a resilient engagement into recesses on the ring thus holding the body in place. The threaded arrangement however has the significant advantage that the body can be threaded down into engagement of the shoulder with the end face of the ring in the form of a bolt in a nut which thus provides a tight fit between the two elements which is resistant to vibration.

In order to assist in locating the transmitter in the mold during casting of the silicone rubber around the transmitter, a short peg can be inserted through the hole to hold the transmitter in place.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An electronic tagging apparatus comprising:

an electronic transmitter for transmitting an electronic code signal providing an identification code substantially unique to the transmitter;

and a housing arranged for mounting the transmitter on an object to be tagged and arranged such that the housing encloses the transmitter and protects the transmitter from heat, water, corrosive materials and trauma, the housing comprising:

a substantially rigid mounting member for attachment to the object;

a body enclosing the transmitter;

and means mounting the body on the mounting member;

the body being formed by molding from an elastomeric material with the transmitter embedded within the material during molding so as to be fully encapsulated by the elastomeric material and so that all outer surfaces of the body are maintained at a spaced position from the transmitter determined by a thickness of the molded elastomeric material therebetween;

the molded elastomeric material being stiff so that all outer surfaces of the molded body are supported at said spaced position from the transmitter by a stiffness of the elastomeric material.

2. The apparatus according to claim 1 wherein the body is molded from silicone rubber.

3. The apparatus according to claim 1 wherein the mounting member comprises a rigid structure formed from a rigid material separate from and different from the elastomeric material and wherein the rigid structure is arranged for rigid attachment to the object.

4. The apparatus according to claim 3 wherein the mounting member is shaped to define a recess having rigid sides at least partly surrounding the recess and wherein at least part of the outer surfaces of the body are arranged to engage at least part of the sides of the recess to hold the body and the transmitter within the recess with the transmitter spaced from the sides of the recess by the thickness of the body.

5. The apparatus according to claim 4 wherein recess of the mounting member has an open front face and wherein the body includes an insert portion which is shaped to engage into the recess and includes an end portion which defines a front surface covering the open front face.

6. The apparatus according to claim 5 wherein the insert portion of the body includes connecting means molded thereon for releasably and readily reengageably connecting with the mounting member.

7. The apparatus according to claim 5 wherein the sides of the recess of the mounting member form an annular ring and wherein the insert portion has a cylindrical outer surface for engaging into the ring.

8. The apparatus according to claim 7 wherein the insert portion carries a male thread on the cylindrical outer surface and wherein the ring has a female thread on an inside surface thereof.

9. The apparatus according to claim 5 wherein the end portion is of larger transverse dimension than the open front face to define a shoulder surrounding the open front face.

10. Apparatus for tracking a plurality of product elements during transportation thereof comprising:

a plurality of transport devices for moving the product elements through a series of processing stations, each transport device being arranged to receive a respective one of the plurality of product elements;

each transport device having mounted thereon the electronic tagging apparatus according to claim 1.

11. An electronic tagging apparatus comprising:

an electronic transmitter for transmitting an electronic code signal providing an identification code substantially unique to the transmitter;

and a housing arranged for mounting the transmitter on an object to be tagged and arranged such that the housing encloses the transmitter and protects the transmitter from heat, water, corrosive materials and trauma, the housing comprising:

a body enclosing the transmitter the body being formed by molding from an elastomeric material with the transmitter embedded within the material during molding so as to be fully encapsulated by the elastomeric material and so that all outer surfaces of the body are spaced from the transmitter by a thickness of the molded elastomeric material;

a substantially rigid mounting member comprising a rigid structure formed from a rigid material separate from and different from the elastomeric material and wherein the rigid structure is arranged for rigid attachment to the object;

and means mounting the body on the mounting member;

the mounting member being shaped to define a recess having rigid sides at least partly surrounding the recess and wherein at least part of the outer surfaces of the body are arranged to engage at least part of the sides of the recess to hold the body and the transmitter within the recess with the transmitter spaced from the sides of the recess by the thickness of the body.

12. The apparatus according to claim 11 wherein the recess of the mounting member has an open front face and wherein the body includes an insert portion which is shaped to engage into the recess and includes an end portion which defines a front surface covering the open front face.

13. The apparatus according to claim 12 wherein the insert portion of the body includes connecting means molded thereon for releasably and readily reengageably connecting with the mounting member.

14. Apparatus for tracking a plurality of product elements during transportation thereof comprising:

a plurality of transport devices for moving the product elements through a series of processing stations, each transport device being arranged to receive a respective one of the plurality of product elements;

each transport device having mounted thereon the electronic tagging device according to claim 11.

15. An electronic tagging apparatus comprising:

an electronic transmitter for transmitting an electronic code signal providing an identification code substantially unique to the transmitter;

and a housing arranged for mounting the transmitter on an object to be tagged and arranged such that the housing encloses the transmitter and protects the transmitter from heat, water, corrosive materials and trauma, the housing comprising:

a body enclosing the transmitter the body being formed by molding from an elastomeric material with the transmitter embedded within the material during molding so as to be fully encapsulated by the elastomeric material and so that all outer surfaces of the body are spaced from the transmitter by a thickness of the molded elastomeric material;

a substantially rigid mounting member comprising a rigid structure formed from a rigid material separate from and different from the elastomeric material and wherein the rigid structure is arranged for rigid attachment to the object;

and means mounting the body on the mounting member;

the mounting member being shaped to define a recess having rigid sides at least partly surrounding the recess and an open front face and wherein the body includes an insert portion which is shaped to engage into the recess and includes an end portion which defines a front surface covering the open front face.

16. The apparatus according to claim 15 wherein the insert portion of the body includes connecting means molded thereon for releasably and readily reengageably connecting with the mounting member.

17. The apparatus according to claim 15 wherein the sides of the recess of the mounting member form an annular ring and wherein the insert portion has a cylindrical outer surface for engaging into the ring.

18. The apparatus according to claim 15 wherein the insert portion carries a male thread on the cylindrical outer surface and wherein the ring has a female thread on an inside surface thereof.

19. Apparatus for tracking a plurality of product elements during transportation thereof comprising:

a plurality of transport devices for moving the product elements through a series of processing stations, each transport device being arranged to receive a respective one of the plurality of product elements;

each transport device having mounted thereon the electronic tagging apparatus according to claim 15.

20. Apparatus for tracking a plurality of product elements during transportation thereof comprising:

a plurality of transport devices for moving the product elements through a series of processing stations, each transport device being arranged to receive a respective one of the plurality of product elements;

each transport device having mounted thereon the electronic tagging apparatus according to claim 16.

* * * * *